United States Patent
Shoham et al.

(10) Patent No.: US 7,565,496 B2
(45) Date of Patent: Jul. 21, 2009

(54) SHARING MEMORY AMONG MULTIPLE INFORMATION CHANNELS

(75) Inventors: Doron Shoham, Shoham (IL); Rami Zemach, Herzeliya (IL); John J. Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 11/040,797

(22) Filed: Jan. 22, 2005

(65) Prior Publication Data

US 2006/0168405 A1      Jul. 27, 2006

(51) Int. Cl.
G06F 13/00 (2006.01)
G06F 13/28 (2006.01)
G06F 15/173 (2006.01)

(52) U.S. Cl. .................. 711/156; 711/149; 709/238
(58) Field of Classification Search .................. None
See application file for complete search history.

(56) References Cited

U.S. PATENT DOCUMENTS

| | | | |
|---|---|---|---|
| 4,528,624 A * | 7/1985 | Kamionka et al. ........ | 718/104 |
| 6,754,785 B2 | 6/2004 | Chow et al. | |
| 6,763,328 B1 | 7/2004 | Egolf et al. | |
| 6,891,834 B1 | 5/2005 | Dally et al. | |
| 6,917,954 B2 | 7/2005 | Ahmad et al. | |
| 7,146,482 B2 | 12/2006 | Craddock et al. | |
| 7,152,124 B1 * | 12/2006 | Puri et al. ........... | 710/20 |
| 7,234,037 B2 | 6/2007 | Errickson et al. | |
| 7,239,641 B1 | 7/2007 | Banks et al. | |
| 2002/0039350 A1 | 4/2002 | Wang et al. | |
| 2006/0153185 A1 * | 7/2006 | Jain et al. ............ | 370/389 |

* cited by examiner

*Primary Examiner*—Kevin Verbrugge
*Assistant Examiner*—Eric S Cardwell
(74) *Attorney, Agent, or Firm*—The Law Office of Kirk D. Williams

(57) ABSTRACT

Memory is shared among multiple information channels, which may be of particular use for storing streams of packets. Memory allocation information is maintained which can be used to identify the current number of memory segments (e.g., some definable amount of memory) allocated for each of the multiple channels as well as the available number of shared memory segments. Items, such as, but not limited to data, packets, etc., are received and stored in the memory according to the memory allocation information. After a first processing stage for an item, the memory allocation information is updated to reflect an expected number of available memory segments to become available for the respective channel after a subsequent second processing stage. After the second processing stage is completed for an item, its number of memory segments are de-allocated based on the expected available data. In one embodiment, these memory segments are de-allocated one at a time.

25 Claims, 8 Drawing Sheets

SHARING MEMORY AMONG MULTIPLE INFORMATION CHANNELS

TECHNICAL FIELD

One embodiment of the invention relates to communications and computer systems, especially routers, packet switching systems, and other devices; and more particularly, one embodiment relates to sharing memory among multiple information channels, which may be of particular use for storing streams of packets.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards packets. For example, an enqueuing component of such a device receives streams of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are typically maintained in a separate memory. Once the entire packet is written into memory, the packet becomes eligible for processing, and an indicator (e.g., a packet handle) of the packet is typically placed in an appropriate destination queue for being serviced according to some scheduling methodology for packet processing. When this packet processing is complete, the packet is then gathered for sending (e.g., another processing function to build the processed packet to be forwarded based on the packet handle). The packet is then forwarded and the memory previously required for storing the sent packet becomes available for storing new information.

A packet processing mechanism receives multiple channels/streams of packets (typically in parallel), processes the packets (typically in parallel), and then gathers (e.g., builds) and forwards the processed packets (often serially, one packet at a time).

In one prior approach, each channel is allocated its own portion of memory for storing packets. This approach typically requires a substantial amount of memory, often with its overall occupancy level being low. For example, if a small amount of memory is allocated for each channel, this memory may be consumed by packets being processed or waiting to be gathered and forwarded. Thus, incoming packets are either dropped or back pressure (e.g., flow control) is used to stop the incoming flow of packets. For illustrative purposes, assume the memory for all channels is consumed, thus no more packets can be received. After a packet is sent, the memory used to store the sent packet becomes available. In this approach with memory dedicated to individual channels, then the channel corresponding to the sent packet is able to receive a new packet, but packets cannot be received by other channels. This problem is exacerbated when packets are received over multiple channels and packets are sent out over a single channel. One prior approach to avoid this problem is to provide enough (and typically a large amount of) memory for each channel.

Another approach reduces the amount of overall memory required by sharing memory for storing packets received over multiple channels. This presents the issue of how to share this resource (e.g., memory).

When there is a contention for resources, such as on output links of a packet switching system or interface or even for memory or compute cycles, it is important for resources to be allocated or scheduled according to some priority and/or fairness policy. Moreover, the amount of work required to schedule and to enqueue and dequeue a packet or other scheduled item is important, especially as the operating rate of systems increase. Many different mechanisms are available to share resources, and many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin which assigns each bit of each packet in the system an ideal finish time according to the weighted fair sharing of the system. This is typically not practical in a packet-based system unless all packets are one bit. Generalizing the algorithm from bit-by-bit to packet-by-packet, each packet is assigned an ideal finish (departure) time and the packets are served in order of the earliest departure time. The inclusion of theoretical departure times in a scheduling method typically requires insertion into a sorted list which is known to be an O(log N) problem implemented in software, where N is typically the number of queues. In hardware, this problem may be reduced to an O(1) operation with O(log N) resources.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its deficit is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bytes sent) is maintained for the next DRR round.

DRR has a complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal." In particular, latency for a system with N queues is Q*N where Q is the average quantum, which must be at least one maximum transmission unit (MTU). However, when a schedule entry is used to schedule multiple rates and/or types of traffic, multiple deficits are typically needed, and a significant amount of work may be required to update multiple deficits in response to sending of a packet, for example.

SUMMARY

Disclosed are, inter alia, methods, apparatus, data structures, computer-readable media, and mechanisms, for sharing memory among multiple information channels, which may be of particular use for storing streams of packets. One embodiment maintains memory allocation information, which can be used to identify the current number of memory segments allocated for each of the multiple channels as well as a number of shared memory segments available for allocating to the memory channels. A memory segment is typically a defined amount of memory, such as one or more bits, bytes, memory blocks, memory pages, etc.). Items, such as, but not limited to data, packets, etc., are received and stored in the memory according to the memory allocation information. After a first processing stage for an item, the memory allocation information is updated to reflect an expected number of available memory segments to become available for the respective channel after a subsequent second processing stage. After the second processing stage is completed for an item, its number of memory segments are de-allocated based on the expected available data. In one embodiment, these memory segments are de-allocated one at a time.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
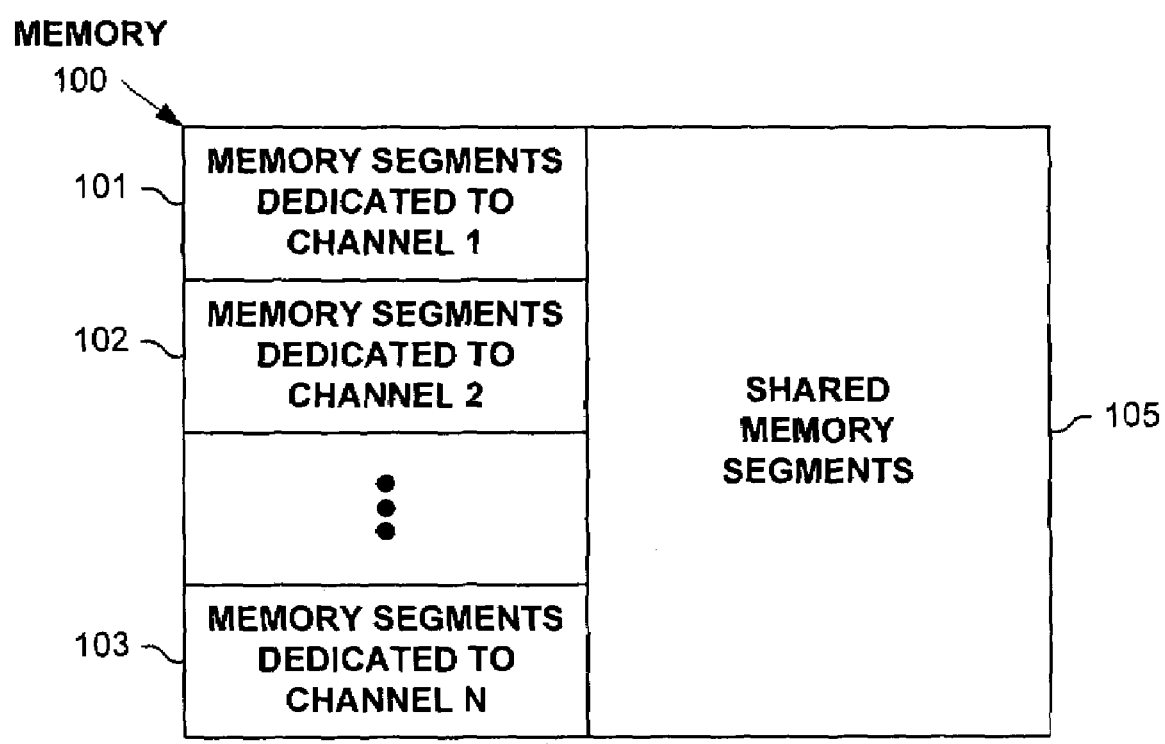
FIG. 1 is a block diagram of illustrating the sharing of memory in one embodiment.

Disclosed are, inter alia, methods, apparatus, data structures, computer-readable media, and mechanisms, for sharing memory among multiple information channels, which may be of particular use for storing streams of packets.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to, all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory," etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, and mechanisms, for sharing memory among multiple information channels, which may be of particular use for storing streams of packets. One embodiment maintains memory allocation information, which can be used to identify the current number of memory segments allocated for each of the multiple channels as well as a number of shared memory segments available for allocating to one of the memory channels. A memory segment is typically a defined amount of memory, such as one or more bits, bytes, memory blocks, memory pages, etc.). Items, such as, but not limited to data, packets, etc., are received and stored in the memory according to the memory allocation information. After a first processing stage for an item, the memory allocation information is updated to reflect an expected number of available memory segments to become available for the respective channel after a subsequent second processing stage. After the second processing stage is completed for an item, its number of memory segments are de-allocated based on the expected available data. In one embodiment, these memory segments are de-allocated one at a time.

One embodiment maintains memory allocation information for multiple information channels, with this memory allocation information typically including data to identify a number of memory segments allocated for storing information for each of the information channels. Shared pool memory allocation information is also maintained with this shared pool memory allocation information including data to identify a number of memory segments allocated for sharing among the information channels. Information is received corresponding to the information channels and is stored in memory based on the memory allocation information and/or the shared pool memory allocation information. In response to completing a first processing stage of an item which is stored in a particular number of the memory segments allocated to a particular one of the information channels: expected available information is updated to reflect the particular number of memory segments to become available after a subsequent second processing stage. In response to completing the second processing stage of the item of information, the particular number of memory segments are de-allocated based on the expected available information, which is updated based on the de-allocated particular number of memory segments. This de-allocating of memory segments typically includes decreasing the number of memory segments allocated for storing information by at least one for at least one of the information channels.

In one embodiment, de-allocating includes increasing by at least one the number of memory segments allocated for sharing among the information channels. In one embodiment, this de-allocating includes decreasing the number of memory segments allocated for storing information by at least one for at least two of the information channels. In one embodiment, de-allocating of the particular number of memory segments includes de-allocating the particular number of memory segments one at a time. In one embodiment, the item corresponds to a packet. In one embodiment, the second stage processing includes forwarding the packet so that the particular number of memory segments are no longer required for storing the packet.

In one embodiment, de-allocating the particular number of memory segments includes selecting at least one of the information channels from only eligible information channels for decreasing their allocated number of memory segments, wherein an information channel is eligible only if the expected available information reflects that the information channel is associated with one or more of the memory segments to become available. In one embodiment, this selecting operation is performed based a round robin of the eligible information channels. In one embodiment, the de-allocating the particular number of memory segments includes selecting a particular information channel of the information channels with a largest difference between its number of memory segments allocated for storing information and its minimum number of memory segments, at least one of the information channels including the particular information channel. In one embodiment, this de-allocating the particular number of memory segments includes selecting at least one of the information channels from the information channels for decreasing their number of memory segments allocated for storing information based on a proportional weighted amount based on their corresponding number of memory segments to become available after the subsequent second processing stage.

One embodiment maintains a count of a number of memory segments allocated for storing packets for each of multiple packet channels, a count of a number of shared memory segments available for storing packets, and a count of a number of memory segments expected to become available for each of the packet channels. In response to completing a first processing stage of a particular packet of a particular packet channel of the packet channels, the particular packet being associated a particular number of memory segments: increasing the count of the number of memory segments expected to become available for the particular packet channel by the particular number. After completing a second processing stage of the particular packet subsequent to updating the count of the number of memory segments expected to become available for the particular packet channel, repeating for the particular number: arbitrating to select a deallocation packet channel of the packet channels; decreasing by one the count of the number of memory segments allocated for storing packets for the deallocation packet channel, or decreasing by one the count of the number of memory segments allocated for storing packets for the deallocation packet channel and increasing by one the count of the number of shared memory segments available for storing packets for each of the packet channels; and decreasing by one the count of a number of memory segments expected to become available for the deallocation packet channel.

In one embodiment, the deallocation packet channel is different than the particular packet channel. In one embodiment, the operation of increasing by one the count of the number of shared memory segments is performed when the deallocation packet channel's number of memory segments allocated for storing packets is greater than its configured minimum number of memory segments. In one embodiment, arbitrating includes selecting the deallocation packet channel based on the counts of the number of memory segments expected to become available for the packet channels. In one embodiment, the deallocation packet channel is selected based on a proportional weighted amount based on the counts of the number of memory segments expected to become available for the packet channels. In one embodiment, arbitrating includes selecting the deallocation packet channel from a group comprising only eligible packet channels of the packet channels, wherein each of the packet channels is eligible only if its count of the number of memory segments expected to become available is greater than zero. In one embodiment, arbitrating includes selecting the deallocation packet channel as the packet channel of the packet channels with a largest difference between its count of the number of memory segments allocated for storing packets and its configured minimum number of memory segments.

FIG. 1 is a block diagram of illustrating the sharing of memory 100 according to one embodiment. As shown, memory 100 is partitioned into multiple groups 101-105 of memory segments, with each of groups 101-103 allotted corresponding to a channel and/or stream of information (e.g., data, packets). The memory segments of group 105 is allotted for sharing amongst the channels and/or streams of information. Note, in one embodiment, groups 101-103 contain no memory segments as all memory segments of memory 100 are shared.

Figure 2:
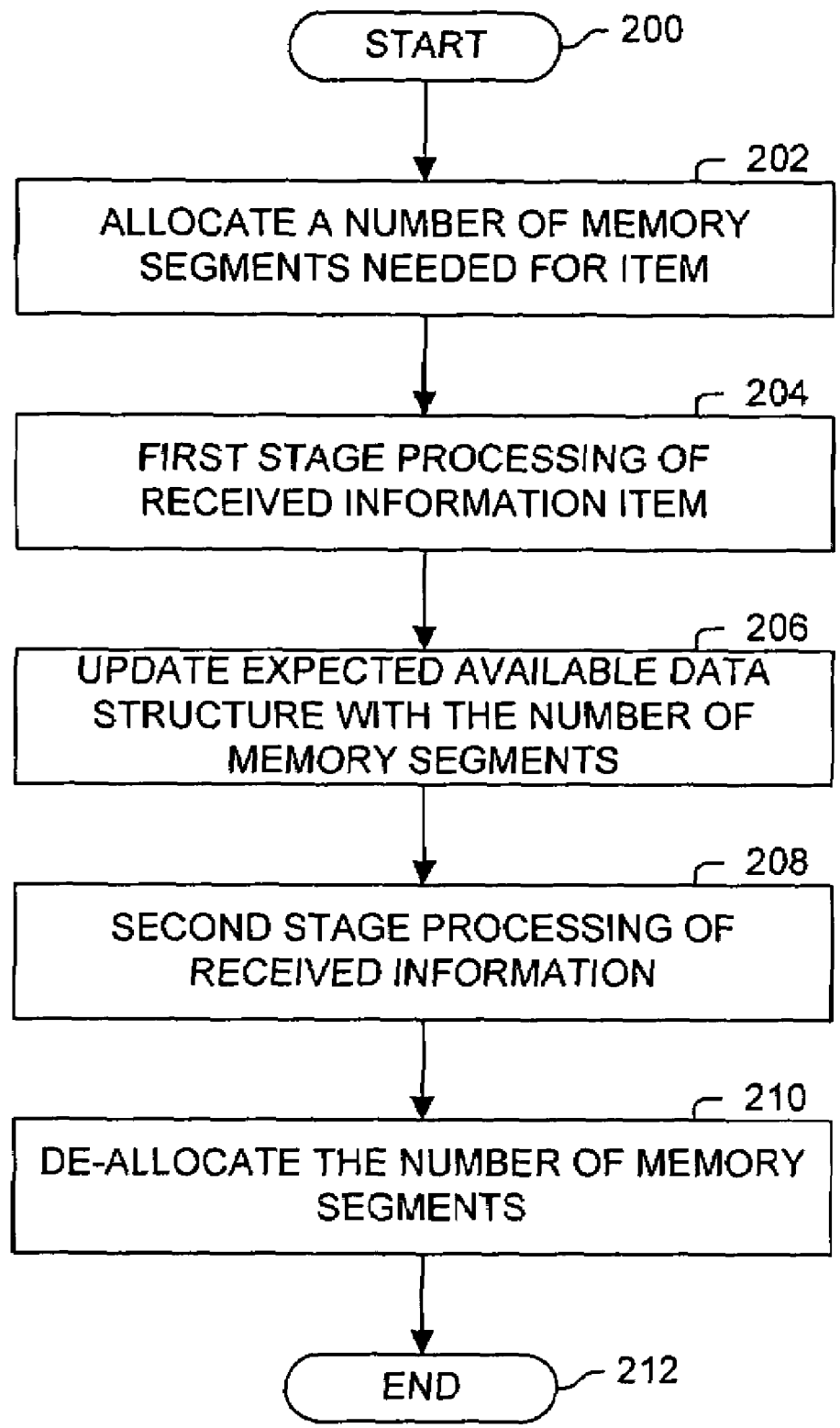
FIG. 2 is a flow diagram illustrating the process of an item in one embodiment.

FIG. 2 is a flow diagram illustrating the process of an item in one embodiment. Processing begins with process block 200, and proceeds to process block 202, wherein the number of memory segments required for the item are allocated. In process block 204, a first stage of processing is performed on the item. Then, in process block 206, an expected available data structure is updated with the number of memory segments becoming available from the items' channel. In process block 208, the second stage processing of the item is performed. In process block 210, the number of memory segments are de-allocated from one or more different channels, and quite possibly from more than one different channels. Processing is complete as indicated by process block 212.

Figure 3A:
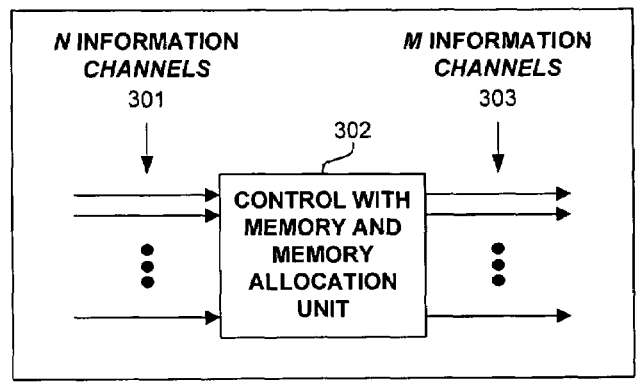
FIG. 3A is a block diagram illustrating a mechanism sharing memory segments according to one embodiment.

FIG. 3A is a block diagram illustrating a mechanism sharing memory segments according to one embodiment. As shown, n information channels 301 are used to receive items, which are processed as described herein by control with memory and memory allocation unit 302, with the processed items sent out over m information channels 303. Note, in one embodiment, n is equal to m. In one embodiment, m is equal to one. In one embodiment, m is equal to zero (e.g., items are received and processed, without forwarding the processed items).

Figure 3B:
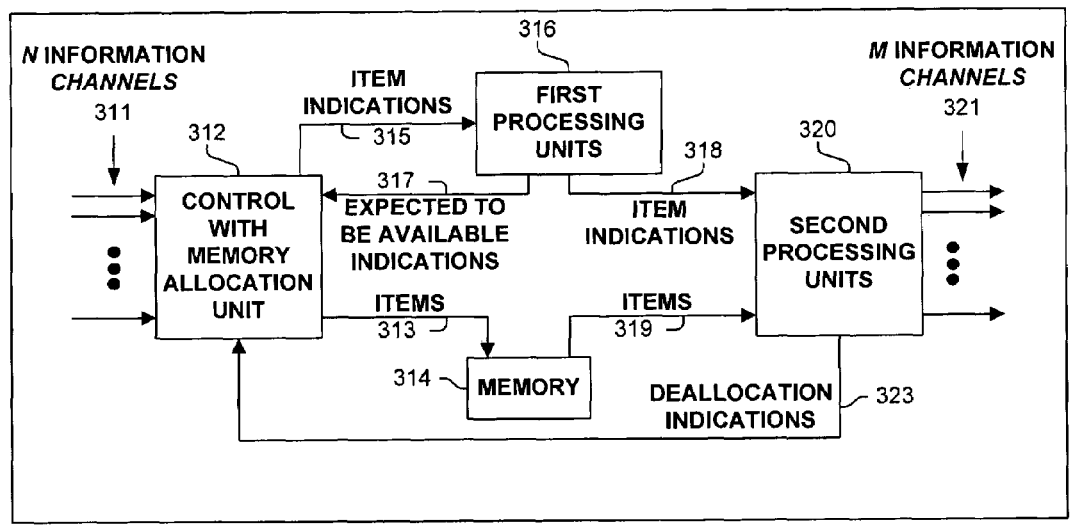
FIG. 3B is a block diagram illustrating a mechanism sharing memory segments according to one embodiment.

FIG. 3B is a block diagram illustrating a mechanism sharing memory segments according to one embodiment. As shown, n information channels 311 are used to receive items, which are processed as described herein, with the processed items sent out over m information channels 303. Note, in one embodiment, n is equal to m. In one embodiment, m is equal to one. In one embodiment, m is equal to zero (e.g., items are received and processed, without forwarding the processed items).

In one embodiment, control 312 with memory allocation unit receives items over information channels 311. The items 313 are stored in memory 314 as allowed by the current allocated number of memory segments for each channel, possibly using some of a number of memory segments allocated to one or more shared pools of memory segments. Indications 315 of the received items are forwarded to one or more first processing units 316, which process the items (typically multiple items simultaneously). When processing of an item is complete, an indication 317 of the number of memory segments to expect to become available is sent to control 312 for use in de-allocating memory segments when they become available, and an indication 318 of the item is forwarded to the one or more second processing unit 320. After a second processing unit 320 has completed processing an item, one or more deallocation indications 323 are signaled to control 312. In one embodiment, one memory segment is de-allocated at a time. One embodiment uses a single second processing unit 320.

Figure 3C:
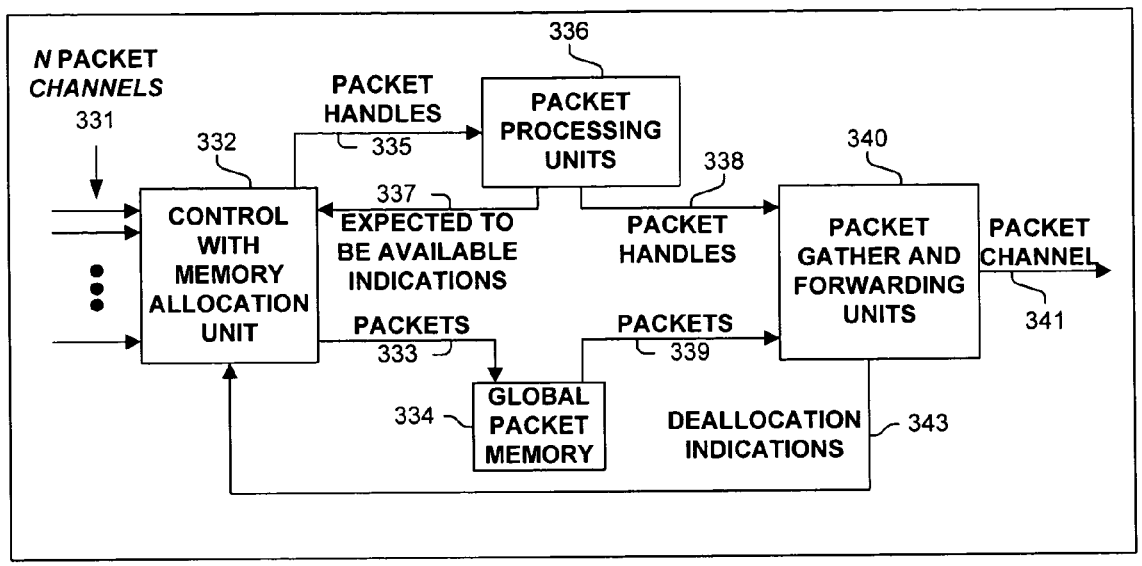
FIG. 3C is a block diagram illustrating a mechanism sharing memory segments according to one embodiment.

FIG. 3C is a block diagram illustrating a mechanism sharing memory segments according to one embodiment. As shown, n information channels 331 are used to receive packets, which are processed as described herein, with the processed packets sent out over information channels 341. Note, in one embodiment, more than one output channel is used as shown and described herein.

In one embodiment, control 332 with memory allocation unit receives packets over information channels 331. The packets 333 are stored in global packet memory 334 as allowed by the current allocated number of memory segments for each channel, possibly using some of a number of memory segments allocated to one or more shared pools of memory segments. Packet handle indications 335 of the received packets are forwarded to one or more packet processing units 336, which process the packets (typically multiple packets simultaneously). When processing of a packet is complete, an indication 337 of the number of memory segments to expect to become available is sent to control 332 for use in de-allocating memory segments when they become available, and a packet handle indication 338 of the packet is forwarded to the one or more packet gather and forwarding units 340. After a packet gather and forwarding unit 340 has completed processing a packet, one or more deallocation indications 323 are signaled to control 332. In one embodiment, one memory segment is de-allocated at a time. One embodiment uses a single packet gather and forwarding unit 340.

Figure 3D:
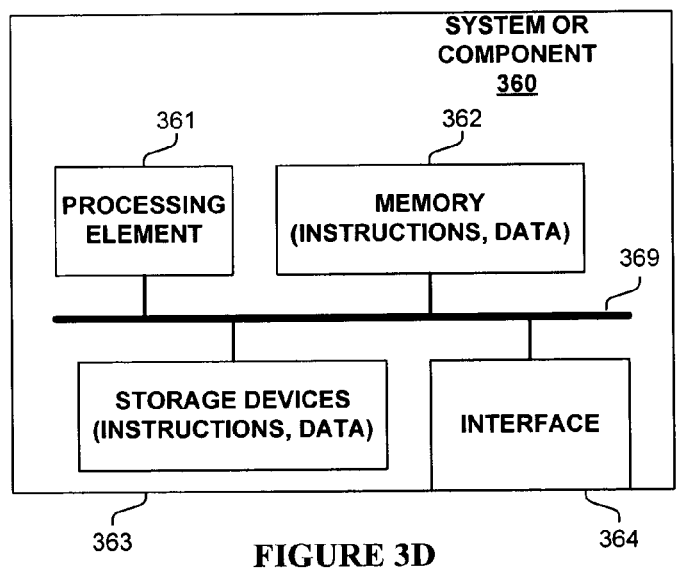
FIG. 3D is a block diagram illustrating a mechanism sharing memory segments according to one embodiment.

FIG. 3D is a block diagram of an exemplary system or component 360 used in sharing memory segments. In one embodiment, system or component 360 performs one or more processes corresponding to one of the flow diagrams illustrated or otherwise described herein.

In one embodiment, component 360 includes a processing element 361 (e.g., a processor, customized logic, etc.), memory 362, storage devices 363, and an interface 364 for receiving and sending packets, items, and/or other information, which are typically coupled via one or more communications mechanisms 369 (shown as a bus for illustrative purposes.) Various embodiments of component 360 may include more or less elements. The operation of component 360 is typically controlled by processing element 361 using memory 362 and storage devices 363 to perform one or more scheduling tasks or processes. Memory 362 is one type of computer-readable medium, and typically comprises random access memory (RAM), read only memory (ROM), flash memory, integrated circuits, and/or other memory components. Memory 362 typically stores computer-executable instructions to be executed by processing element 361 and/or data which is manipulated by processing element 361 for implementing functionality in accordance with the invention. Storage devices 363 are another type of computer-readable medium, and typically comprise solid state storage media, disk drives, diskettes, networked services, tape drives, and other storage devices. Storage devices 363 typically store computer-executable instructions to be executed by processing element 361 and/or data which is manipulated by processing element 361 for implementing functionality in accordance with the invention.

Figure 4A:
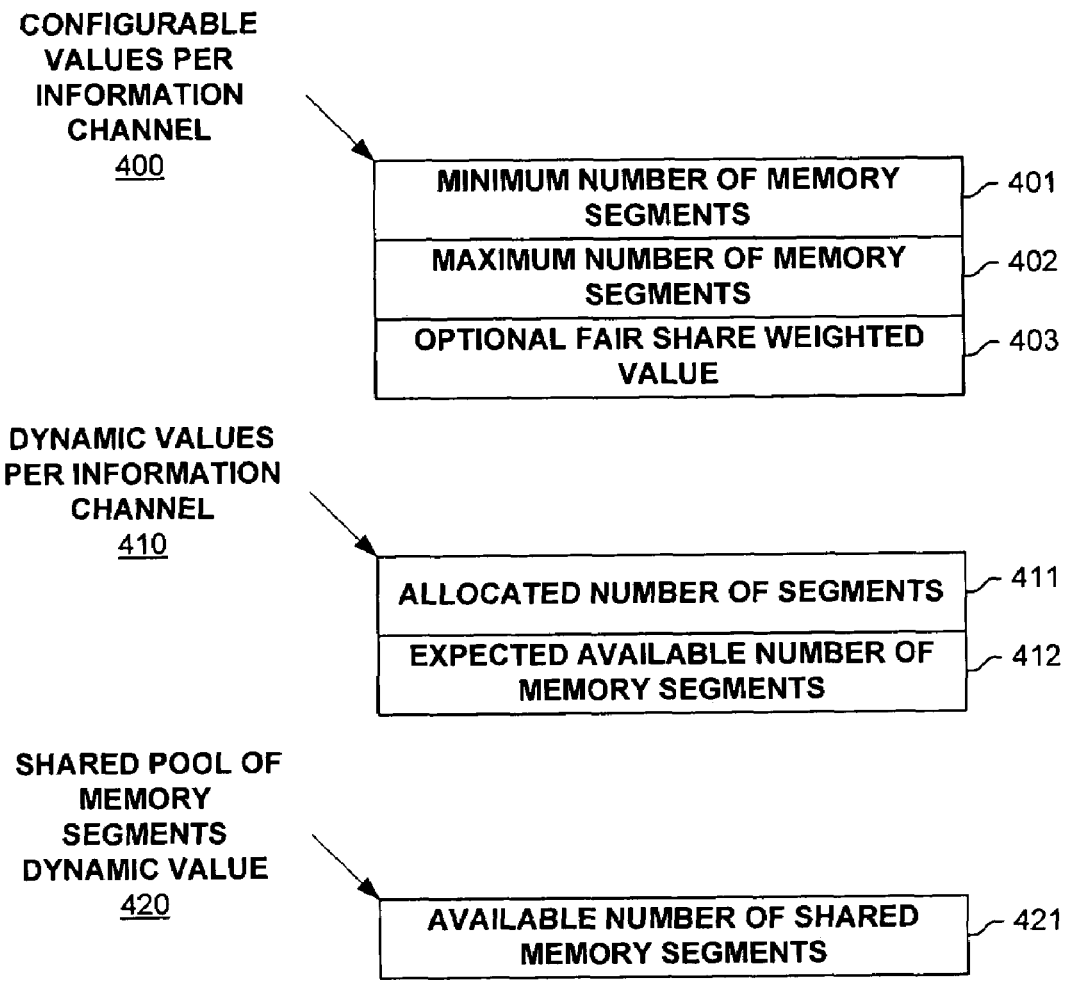
FIG. 4A is a block diagram illustrating some information maintained in one embodiment.

FIG. 4A is a block diagram illustrating some information maintained in one embodiment. As shown, one embodiment uses some configuration information 400 for each channel in determining how to de-allocate memory segments. In one embodiment, this configuration information 400 includes a guaranteed minimum number 401 of memory segments, a maximum allowable number 402 of memory segments, and an optional fair share weighted value 403 for use in de-allocating memory segments according to some scheduling algorithm. Also, one embodiment maintains dynamic information 410 for each memory channel. In one embodiment, this dynamic information 410 includes an allocated number 411 of memory segments and an expected available number 412 of memory segments. Also, one embodiment maintains a dynamic shared pool of memory segments 420. In one embodiment, dynamic shared pool of memory segments 420 includes an available number 421 of memory segments in the shared pool. Note, in one embodiment, available number 421 of memory segments in the shared pool is initialized to the total number of memory segments in the memory available for storing information minus the sum of the minimum number of memory segments 401 for each of the information channels.

Figure 4B:
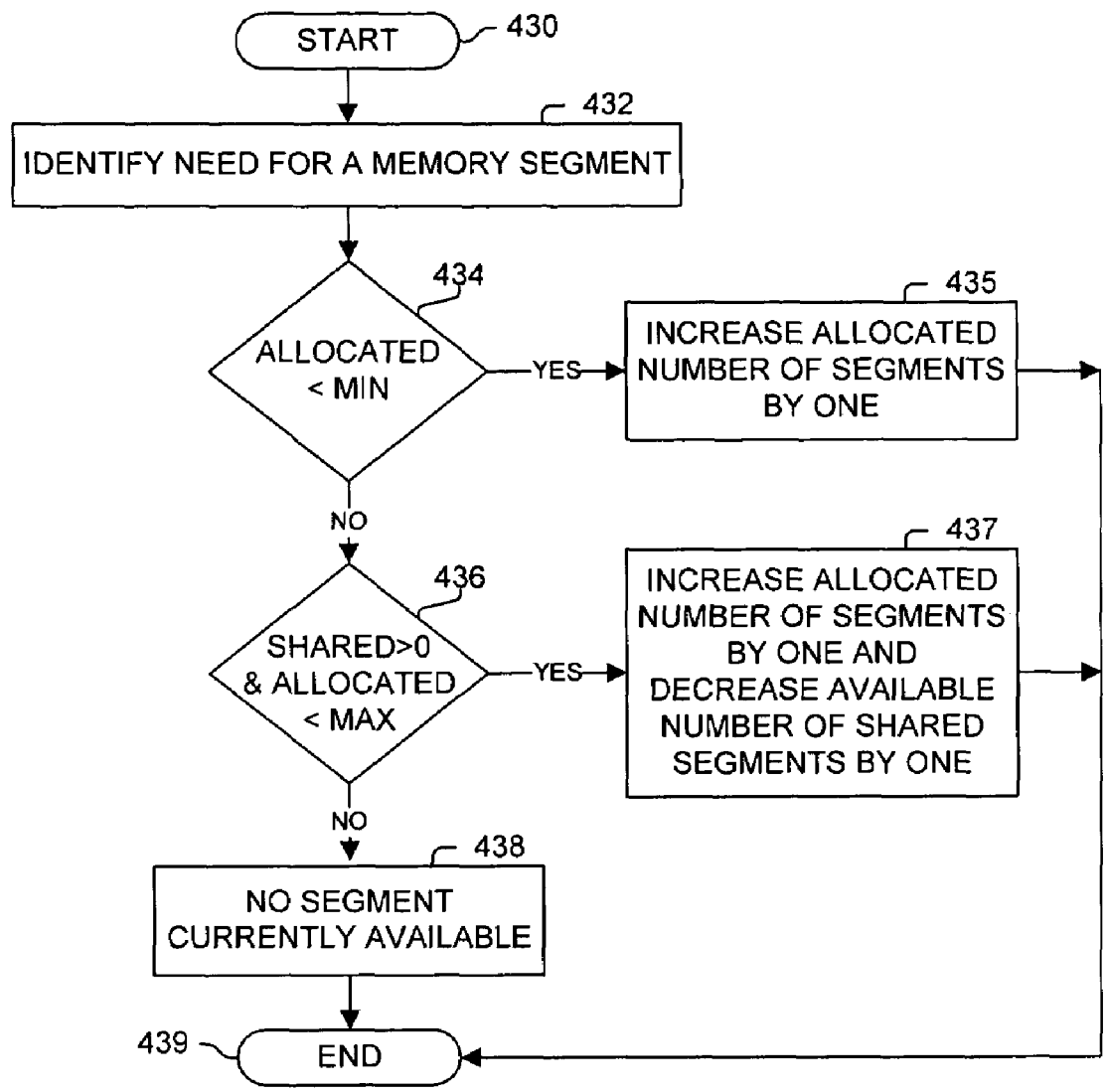
FIGS. 4B-D are flow diagrams illustrating processes for sharing memory performed in one embodiment.
Figure 4C:
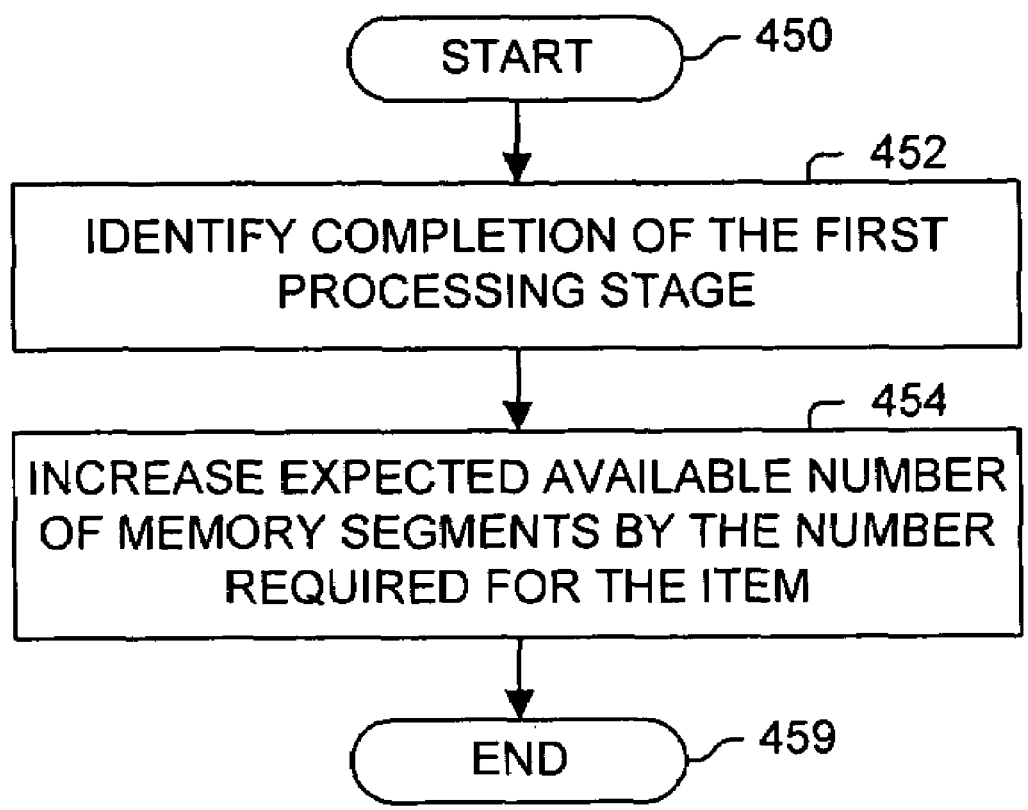
Figure 4D:
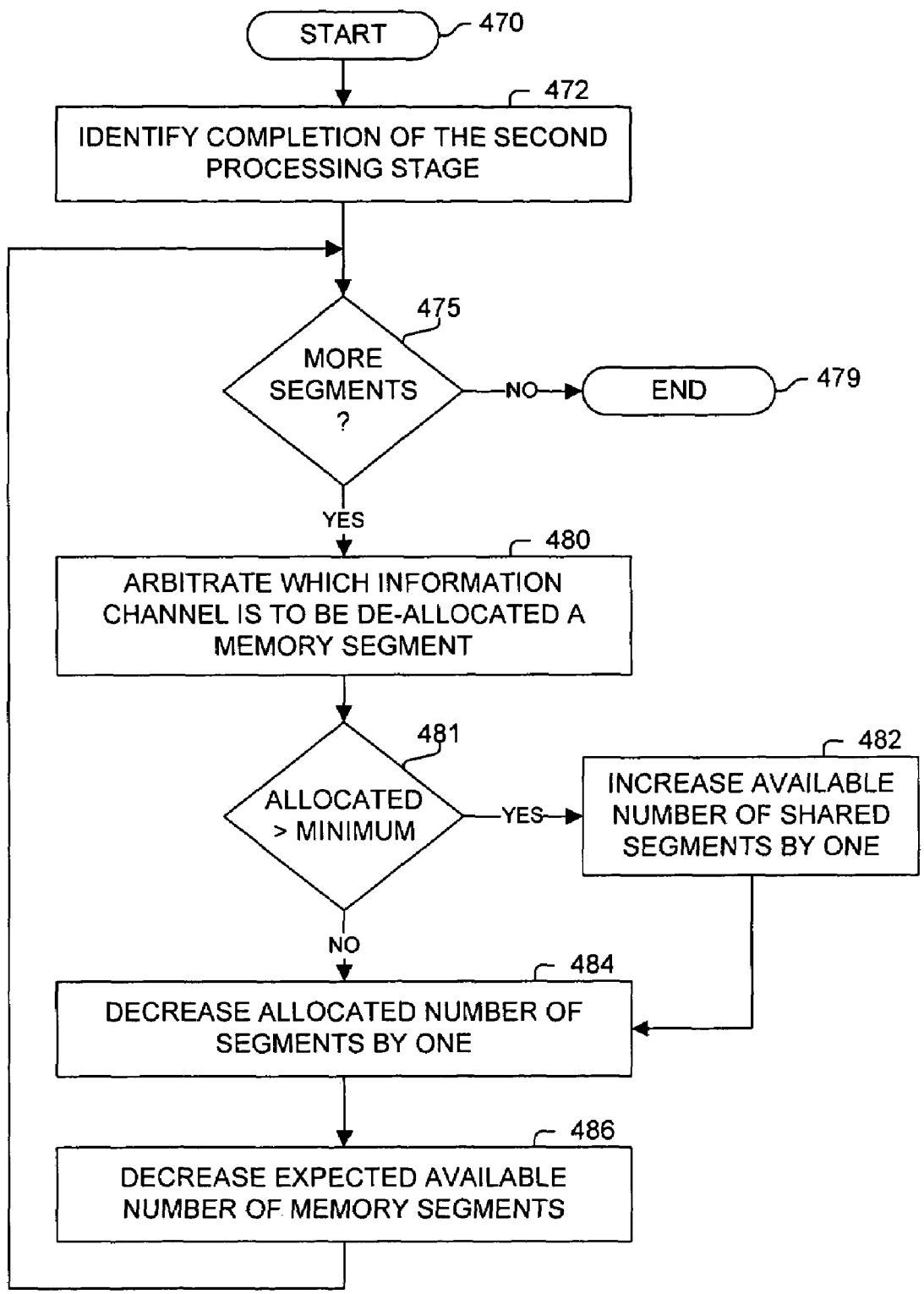

FIGS. 4B-D are flow diagrams illustrating processes for sharing memory performed in one embodiment. Note, these process allocate and de-allocate one memory segment at a time as performed in one embodiment. In another embodiment, multiple memory segments may be allocated and de-allocated at time (which can be performed similar to that shown in FIGS. 4B-D as understood by one skilled in the art with the appropriate changes in math—e.g., increase by the number of memory segments instead of one, etc.).

Turning to FIG. 4B, processing beings with process block 430, and proceeds to process block 432, wherein a need for a memory segment is identified. As determined in process block 434, if the current number of allocated memory segments for the information channel is less than its minimum number, then in process block 435, the number of allocated memory segments for the information channel is increased by one. Otherwise, as determined in process block 436, if there is at least one shared memory segment available and the information hasn't used its maximum number of memory segments, then in process block 437, the number of allocated memory segments for the information channel is increased by one and the number of shared memory segments available is decreased by one. Otherwise, there is no segment currently available as indicated by process block 438, and some corresponding processing is typically performed such as dropping information and flow control signaling. Processing is complete as indicated by process block 439.

Turning to FIG. 4C, processing begins with process block 450, and proceeds to process block 452, wherein the first stage of processing of an item is identified as being completed. Then, in process block 454, the expected available number of memory segments for a corresponding channel is increased by the particular number of memory segments allocated to store the item. Processing is complete as indicated by process block 459.

Turning to FIG. 4D, processing begins with process block 470, and proceeds to process block 472, wherein the second stage of processing of an item is identified as being completed. While there are more memory segments to de-allocate as determined by process block 475, process blocks 480-486 are performed; otherwise processing is complete as indicated by process block 479.

In process block 480, an arbitration procedure is performed to identify which information channel is to be de-allocated a memory segment. Many different arbitration/scheduling mechanisms are known to one skilled in the art, and any of which could be used. For example, one embodiment uses a simple round robin among the information channels that are expecting at least one memory segment to be freed. One embodiment uses a weighted round robin among the information channels that are expecting at least one memory segment to be freed. One embodiment uses a deficit round robin among the information channels that are expecting at least one memory segment to be freed. One embodiment, selects the information channel as one with a largest difference between its number of memory segments allocated and its minimum number of memory segments. One embodiment selects the information channel based on a proportional weighted amount based on the corresponding number of memory segments expected to be freed for the information channels.

As determined in process block 481, if its allocated number is greater than its minimum number of memory segments, then in process block 482, one is added to the shared number of memory segments (i.e., another segment is made available to be shared by the information channels). In process block 484, the number of allocated memory segments for the information channel identified by the arbitration is reduced by one. In process block 486, the number of expected available memory segments is decreased for the information channel identified by the arbitration, and processing returns to process block 475.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a particular apparatus, for allocating memory for use in storing information in the particular apparatus, the method comprising:

maintaining memory allocation information for each of a plurality of information channels, said memory allocation information including data to identify a number of memory segments allocated for storing information for each of the plurality of information channels;

maintaining shared pool memory allocation information, said shared pool memory allocation information including data to identify a number of memory segments allocated for sharing among the plurality of information channels;

maintaining expected available information for each of the plurality of information channels, said expected available information identifying a number of memory segments included in said memory segments allocated in the same information channel for which a first stage, but not yet a second stage, of processing using said memory segments has completed;

receiving information of the plurality of information channels and storing said information based on said memory allocation information or said shared pool memory allocation information;

in response to completing the first processing stage of an item of said information, said item stored in a particular number of a plurality of memory segments allocated to a particular one of the plurality of information channels:

updating expected available information for the particular one of the plurality of information channels to reflect the particular number of memory segments still in use but will become available after a subsequent said second processing stage; and in response to completing the second processing stage of the item of information subsequent to said updating said expected available information: de-allocating the particular number of memory segments based on said expected available information of a plurality of the plurality of information channels and updating said expected available information based on said de-allocated particular number of memory segments, said de-allocating including decreasing the number of memory segments allocated for storing information by at least one for at least one of said information channels.

2. The method of claim 1, wherein said de-allocating includes increasing by at least one the number of memory segments allocated for sharing among the plurality of information channels.

3. The method of claim 1, wherein said de-allocating includes decreasing the number of memory segments allocated for storing information by at least one for at least two of said information channels.

4. The method of claim 1, wherein said de-allocating the particular number of memory segments includes de-allocating the particular number of memory segments one at a time.

5. The method of claim 1, wherein the item includes a packet.

6. The method of claim 5, wherein the second stage processing includes forwarding the packet so that the particular number of memory segments are no longer required for storing the packet.

7. The method of claim 1, wherein said de-allocating the particular number of memory segments includes selecting said at least one of said information channels from only eligible information channels of the plurality of information channels for decreasing their said number of memory segments allocated for storing information, wherein each of said information channels is eligible only if said expected available information reflects that said information channel is associated with one or more of said memory segments to become available.

8. The method of claim 7, wherein said selecting is performed based a round robin of said eligible information channels.

9. The method of claim 1, wherein said de-allocating the particular number of memory segments includes selecting a particular information channel of the plurality of information channels with a largest difference between its said number of memory segments allocated for storing information and its minimum number of memory segments, said at least one of said information channels including the particular information channel.

10. The method of claim 1, wherein said de-allocating the particular number of memory segments includes selecting said at least one of said information channels from the plurality of information channels for decreasing their said number of memory segments allocated for storing information based on a proportional weighted amount among the plurality of information channels based on their said corresponding number of memory segments maintained in said expected available information.

11. An apparatus for allocating memory for use in storing information, the apparatus comprising:

means for maintaining memory allocation information for each of a plurality of information channels, said memory allocation information including data to identify a number of memory segments allocated for storing information for each of the plurality of information channels;

means for maintaining shared pool memory allocation information, said shared pool memory allocation information including data to identify a number of memory segments allocated for sharing among the plurality of information channels;

means for maintaining expected available information for each of the plurality of information channels, said expected available information identifying a number of memory segments included in said memory segments allocated in the same information channel for which a first stage, but not yet a second stage, of processing using said memory segments has completed;

means for updating, in response to completing the first processing stage of an item of said information stored in a particular number of a plurality of memory segments allocated to a particular one of the plurality of information channels, expected available information for the particular one of the plurality of information channels to reflect the particular number of memory segments still in use but will become available after a subsequent said second processing stage; and means for de-allocating the particular number of memory segments based on said expected available information of a plurality of the plurality of information channels and updating said expected available information based on said de-allocated particular number of memory segments after completing the second processing stage, said means for de-allocating including means for decreasing the number of memory segments allocated for storing information by at least one for at least one of said information channels.

12. The apparatus of claim 11, wherein said means for de-allocating includes means for increasing by at least one the number of memory segments allocated for sharing among the plurality of information channels.

13. The apparatus of claim 11, wherein said means for de-allocating includes means for decreasing the number of memory segments allocated for storing information by at least one for at least two of said information channels.

14. A method for allocating memory for use in storing packets, the method comprising:

maintaining a count of a number of memory segments allocated for storing packets for each of a plurality of packet channels;

maintaining a count of a number of shared memory segments available for storing packets;

maintaining, for each of a plurality of packet channels, a count of a number of memory segments expected to become available in the said packet channel on which a first stage, but yet not a second stage, of processing using said memory segments has completed;

in response to completing the first processing stage of a particular packet of a particular packet channel of the plurality of packet channels, the particular packet being associated with a particular number of memory segments: increasing said count of the number of memory segments expected to become available for the particular packet channel by the particular number of memory segments still in use from the first processing stage but that will become available after the second processing stage; and after completing the second processing stage of the particular packet subsequent to said updating said count of the number of memory segments expected to become available for the particular packet channel, repeating for the particular number: arbitrating to select a deallocation packet channel of the plurality of packet channels based on said numbers of memory segments expected to become available for a plurality of the plurality of packet channels; decreasing by one said count of said number of memory segments allocated for storing packets for the deallocation packet channel, or decreasing by one said count of said number of memory segments allocated for storing packets for the deallocation packet channel and increasing by one said count of the number of shared memory segments available for storing packets for each of the plurality of packet channels; and decreasing by one said count of a number of memory segments expected to become available for the deallocation packet channel.

15. The method of claim 14, wherein the deallocation packet channel is different than the particular packet channel.

16. The method of claim 14, wherein said increasing by one said count of the number of shared memory segments available for storing packets for each of the plurality of packet channels is performed when the deallocation packet channel's said number of memory segments allocated for storing packets is greater than its configured minimum number of memory segments.

17. The method of claim 14, wherein said arbitrating includes selecting the deallocation packet channel based on the counts of the number of memory segments expected to become available for the plurality of packet channels.

18. The method of claim 17, wherein the deallocation packet channel is selected based on a proportional weighted amount based on the counts of the number of memory segments expected to become available for the plurality of packet channels.

19. The method of claim 14, wherein said arbitrating includes selecting the deallocation packet channel from a group comprising only eligible packet channels of the plurality of packet channels, wherein each of said packet channels is eligible only if its count of the number of memory segments expected to become available is greater than zero.

20. The method of claim 14, wherein said arbitrating includes selecting the deallocation packet channel as the packet channel of the plurality of packet channels with a largest difference between its count of the number of memory segments allocated for storing packets and its configured minimum number of memory segments.

21. The method of claim 10, wherein said at least one of the information channels is different than the particular one of the plurality of information channels.

22. The method of claim 1, wherein said at least one of the information channels is different than the particular one of the plurality of information channels.

23. The method of claim 1, wherein said expected available information maintained for each particular information channel of the plurality of information channels is a single value representing the total number, for the particular information channel, of memory segments used by the first processing stage and remaining in use for the second processing stage but will be deallocated after the second processing stage.

24. The apparatus of claim 11, wherein said at least one of the information channels is different than the particular one of the plurality of information channels.

25. The apparatus of claim 11, wherein said expected available information maintained for each particular information channel of the plurality of information channels is a single value representing the total number, for the particular information channel, of memory segments used by the first processing stage and remaining in use for the second processing stage but will be deallocated after the second processing stage.

* * * * *